United States Patent
Ensberg et al.

(10) Patent No.: US 10,690,366 B2
(45) Date of Patent: Jun. 23, 2020

(54) HEAT EXCHANGER BLOCKAGE DETECTION

(71) Applicant: Hamilton Sundstrand Corporation, Charlotte, NC (US)

(72) Inventors: Joseph J. Ensberg, West Hartford, CT (US); Thomas M. Zywiak, Southwick, MA (US); Matthew J. Smith, Rochester, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/925,060

(22) Filed: Mar. 19, 2018

(65) Prior Publication Data

US 2019/0285297 A1    Sep. 19, 2019

(51) Int. Cl.
| | | |
|---|---|---|
| *F24F 11/30* | (2018.01) | |
| *F24F 11/88* | (2018.01) | |
| *B64D 13/08* | (2006.01) | |
| *B64D 13/06* | (2006.01) | |
| *F24F 140/60* | (2018.01) | |
| *F24F 110/40* | (2018.01) | |

(Continued)

(52) U.S. Cl.
CPC .............. *F24F 11/30* (2018.01); *B64D 13/06* (2013.01); *B64D 13/08* (2013.01); *F24F 11/88* (2018.01); *B64D 2013/0618* (2013.01); *B64D 2013/0644* (2013.01); *F24F 2110/40* (2018.01); *F24F 2140/60* (2018.01); *F28D 2021/0021* (2013.01); *F28G 13/00* (2013.01)

(58) Field of Classification Search
CPC ...... B64D 13/00; B64D 13/006; B64D 13/08; B64D 13/0603; B64D 2013/0644; B64D 2013/0603; B64D 13/06; B64D 2013/0618; G01P 3/46; F28F 27/00; Y02T 50/56; G05B 23/0283; G05B 23/0254; F24F 11/30; F24F 11/88; F24F 2140/60; F24F 2110/40; F28D 2021/0021
See application file for complete search history.

(56) References Cited

U.S. PATENT DOCUMENTS

| | | | | |
|---|---|---|---|---|
| 5,596,271 A | * | 1/1997 | Lowery | G01P 3/488 324/174 |
| 6,023,138 A | * | 2/2000 | Fried | F04D 27/008 318/434 |

(Continued)

FOREIGN PATENT DOCUMENTS

EP    2792960 A1    10/2014

OTHER PUBLICATIONS

Extended European Search Report for EP Application No. 19163716.4, Dated Aug. 8, 2019, pp. 9.

*Primary Examiner* — Tho V Duong
(74) *Attorney, Agent, or Firm* — Kinney & Lange, P.A.

(57) ABSTRACT

A system and method includes at least one heat exchanger, a ram fan, and a controller. The ram fan is driven by a motor. A motor control circuit is configured to provide power to the motor to drive the ram fan. The ram fan is configured to provide a ram flow through the at least one heat exchanger from a ram air inlet. The controller is configured to determine a blockage level of the at least one heat exchanger based on the power to the motor, a speed of the ram fan, and a temperature of the ram flow at the ram fan.

18 Claims, 2 Drawing Sheets

(51) Int. Cl.
*F28D 21/00* (2006.01)
*F28G 13/00* (2006.01)

(56) References Cited

U.S. PATENT DOCUMENTS

| | | | |
|---|---|---|---|
| 7,261,762 B2 * | 8/2007 | Kang | B01D 46/0086 |
| | | | 116/DIG. 25 |
| 2013/0291651 A1 | 11/2013 | Kelnhofer et al. | |
| 2014/0242956 A1 | 8/2014 | Cheung et al. | |
| 2014/0305610 A1 * | 10/2014 | Zywiak | F28F 27/00 |
| | | | 165/11.1 |
| 2015/0166186 A1 * | 6/2015 | Zywiak | B64D 13/06 |
| | | | 165/279 |
| 2016/0146487 A1 * | 5/2016 | Zywiak | F24D 19/1084 |
| | | | 374/45 |
| 2017/0015426 A1 | 1/2017 | Zywiak | |
| 2017/0242956 A1 * | 8/2017 | Zywiak | G06F 17/5095 |
| 2017/0291600 A1 * | 10/2017 | Styles | B60W 30/00 |
| 2018/0051945 A1 | 2/2018 | Hanov et al. | |

\* cited by examiner

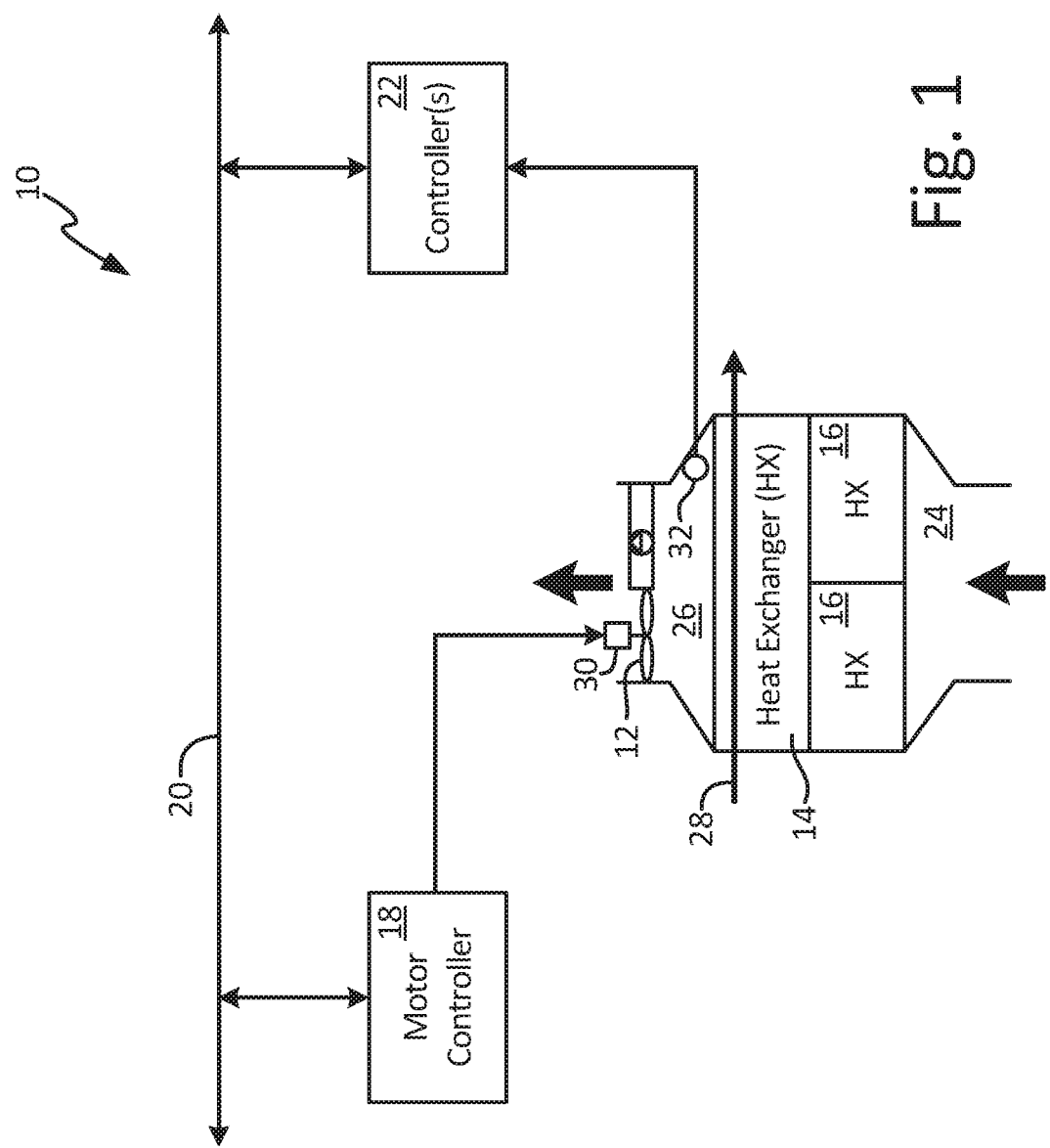

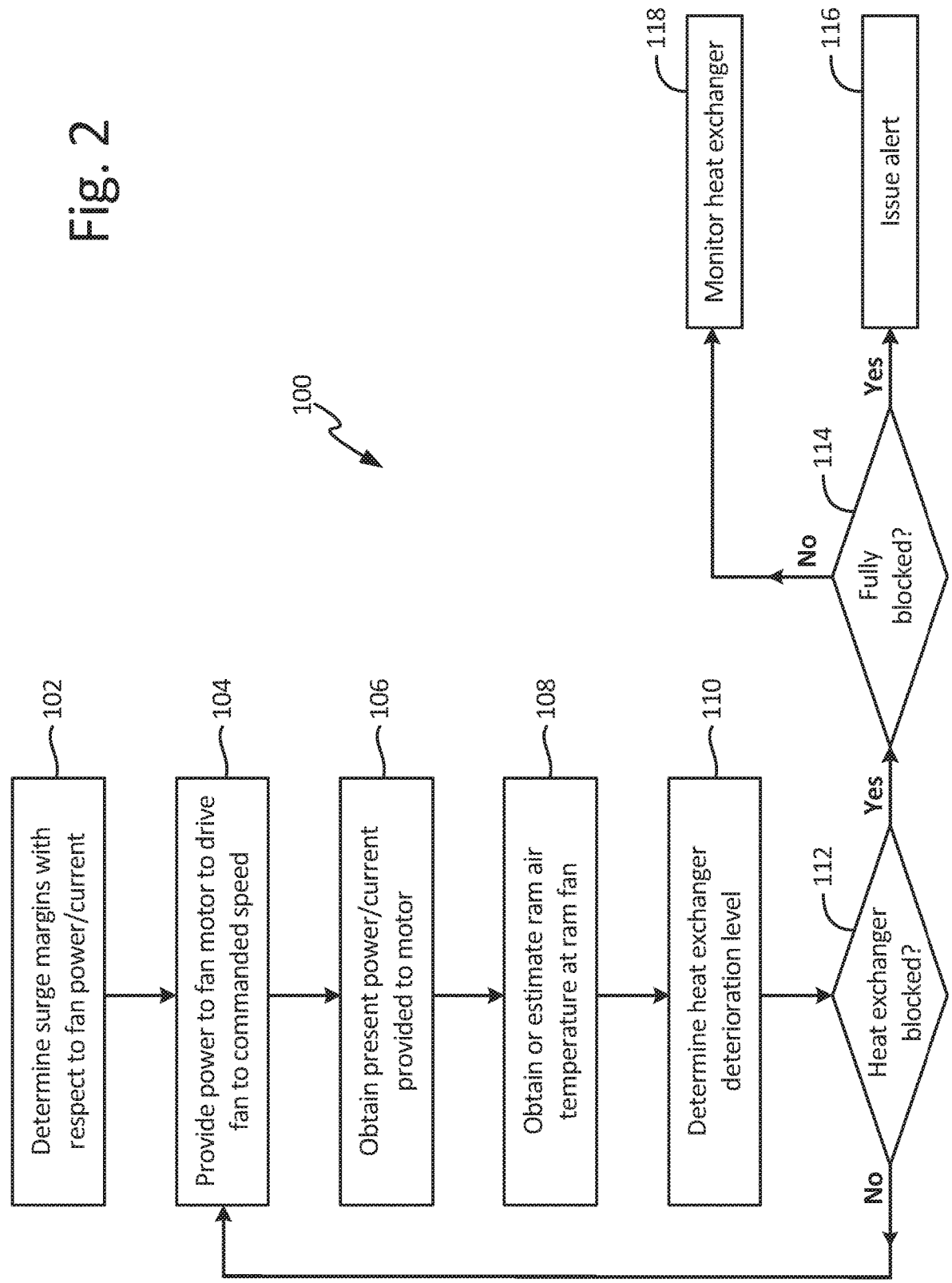

HEAT EXCHANGER BLOCKAGE DETECTION

BACKGROUND

The present invention is related to aircraft environmental control systems, and in particular to a system and method for detecting contamination of heat exchangers within environmental control systems.

Aircraft often include air conditioning "packs" that, among other things, provide conditioned air for the aircraft. These aircraft may also include one or more ram air fans that draw air through the air conditioning packs while the aircraft is grounded. In many systems, the ram air fan draws air through heat exchangers, which are used to cool air from an aircraft compressed air source, such as a cabin air compressor, for example. Contaminants from the ambient air, as well as larger debris, may cause blockage of the heat exchanger, affecting the air flow through the fan and heat exchangers. Significant heat exchanger contamination can reduce the airflow enough that the ram air fan may operate in an unstable operating mode which may lead to excessive blade stress and in turn, failure of the ram air fan.

SUMMARY

A system includes at least one heat exchanger, a ram fan, and a controller. The ram fan is driven by a motor. A motor control circuit is configured to provide power to the motor to drive the ram fan. The ram fan is configured to provide a ram flow through the at least one heat exchanger from a ram air inlet. The controller is configured to determine a blockage level of the at least one heat exchanger based on the power to the motor, a speed of the ram fan, and a temperature of the ram flow at the ram fan.

A method includes driving, by a motor control circuit, a ram fan to draw a ram flow through at least one heat exchanger; providing, by the motor control circuit, power provided to the motor of the ram fan and a speed of the ram fan to a controller; determining, by the controller, a temperature of the ram flow at the ram fan; and determining a blockage level of the at least one heat exchanger based on the power provided to the motor, the speed of the ram fan, and the temperature of the ram flow.

An aircraft environmental control system includes a primary heat exchanger, a ram fan, and a controller. The primary heat exchanger is configured to provide cooling to a compressed air flow. The ram fan is driven by a motor. A motor control circuit is configured to provide current to the motor to drive the ram fan. The ram fan is configured to draw a ram flow through the primary heat exchanger from a ram air inlet. The controller is configured to determine a blockage level of the primary heat exchanger based on the current provided to the motor from the motor control circuit, and a corrected speed of the ram fan.

BRIEF DESCRIPTION OF THE DRAWINGS

FIG. 1 is a block diagram illustrating an environmental control system.

FIG. 2 is a flowchart illustrating a method of determining heat exchanger blockage in environmental control systems.

DETAILED DESCRIPTION

A system and method is disclosed herein for determining heat exchanger blockage based upon monitored ram fan motor current or power. Lab or field data may be utilized to determine an estimated pressure ratio for a ram fan in relation to both the current or power provided to the ram fan and a corrected speed of the ram fan. Based on this determined relationship, during operation of the ram fan, the current or power provided to the ram fan and the speed of the ram fan may be monitored to determine a surge margin of the ram fan. The determined surge margin may be used to determine a heat exchanger blockage level.

FIG. 1 is a diagram illustrating environmental control system (ECS) 10. System 10 includes ram fan 12, heat exchanger (HX) 14, heat exchangers (HX) 16, motor controller 18, data bus 20, and controller(s) 22. Ram fan 12 may be configured to provide a ram air flow through heat exchangers 14 and 16 from ram air inlet 24 to ram air outlet 26. Heat exchanger 14, which may be a primary heat exchanger, may be configured to provide air-to-air cooling for a compressed air flow 28. The compressed air flow 28 may be received from a cabin air compressor (CAC), bled from a gas turbine engine compressor, or received from another source. The cooled air may be provided to other ECS components, such as the components of an air cycle machine (ACM) coupled to ram fan 12. Heat exchangers 16 may be secondary heat exchangers, liquid heat exchangers, or a combination thereof, for providing further cooling for air flow within ECS 10.

Ram fan 12 may be driven by motor 30 using motor controller 18. For example, motor controller 18 provides electrical power to motor 30, which converts the electrical energy into mechanical rotational energy to drive ram fan 12. Controller(s) 22 may, for example, include a pack controller that provides a speed command to motor controller 18. Motor controller 18 provides electrical power to motor 30 and adjusts the electrical power until ram fan 12 has reached the commanded speed.

Over time, heat exchangers 14 and 16 may become contaminated or obstructed. For example, during operation, dirt or other particles, such as cotton-wood seeds, may cause contamination of heat exchangers 14 and 16, which can build-up over time. Also, larger objects may be injected through ram air inlet 24, fully blocking the flow of ram air through heat exchangers 14 and 16. This contamination can lead to a drop in pressure across heat exchangers 14 and 16, reducing the flow through ram fan 12, which can cause ram fan 12 to operate in an unstable operating mode.

In other systems, a pressure difference may be measured across ram fan 12. This pressure difference is used to determine an operating point of the fan, which may then be used to determine a contamination level of heat exchangers 14 and 16. For example, an operating point indicative of a 30% surge margin may be indicative of clean heat exchangers, an 18% surge margin may be indicative of partial, slow contamination of the heat exchangers, a 12% surge margin may be indicative of a full, slow contamination, and 8% surge margin may be indicative of sudden blockage of the heat exchangers. Measuring a pressure difference across ram fan 12 requires extra components and ducting to be installed in system 10. It is desirable to detect contamination of heat exchangers 14 and 16 without the need for installing components to measure the change in pressure across ram fan 12.

The pressure ratio for ram fan 12 may instead be estimated based on the power or current provided to motor 30 from motor controller 18, as well as a corrected speed of ram fan 12. This is due to the fact that the power provided to motor 30 varies for a given corrected speed of ram fan 12 based on the pressure ratio for ram fan 12. For example, when heat exchangers 14 and 16 become contaminated, the ram flow is impeded, requiring more power to maintain ram fan 12 at the same speed. Thus, the power or current provided to motor 30 may be monitored to determine an operating point of ram fan 12. This relationship can be determined, for example, by analyzing lab data or field data for ram fan 12. The corrected speed may be determined using a temperature at ram air outlet 26 which may be sensed by temperature sensor 32, or estimated by controller(s) 22, for example.

With continued reference to FIG. 1, FIG. 2 is a flowchart illustrating method 100 of determining heat exchanger blockage using ram fan power or current from motor controller 18. At step 102, surge margins with respect to ram fan power or current are determined. This determination may be made through lab data, or through field data, for example. For lab data, heat exchangers of varying levels of contamination, from slightly contaminated to full blockage, may be used and the power and/or current to drive ram fan 12 may be monitored and recorded. A relationship may then be established between the corrected speed of ram fan 12 and the power provided to motor 30. The temperature at ram air outlet 26 may be used to determine the corrected speed for ram fan 12.

This lab data may be utilized to form one or more lookup tables, for example, within a memory of controller(s) 22. Each lookup table, or other data structure, may be indexed into using a corrected speed of ram fan 12. The lookup table may be configured to provide a power or current for a surge margin for the chosen corrected speed. For example, a first lookup table may output a power or current indicative of a 30% surge margin for the entered corrected speed, and a second lookup table may output a power or current indicative of a 12% surge margin for the entered corrected speed. These reference power or current obtained from the two lookup tables may then be used to form indicators for heat exchanger blockage. While described with reference to two lookup tables, any number of lookup tables or other data structures may be utilized to generate any number of references for any desired surge margins.

In one example embodiment, the following equation may be utilized to generate a heat exchanger deterioration index based upon the two references obtained using the corrected speed:

$$\text{Deterioration Index} = \frac{P_{act} - P_{30}}{P_{12} - P_{30}} \qquad [1]$$

Where:
$P_{act}$=The actual power being provided to motor 30 from motor controller 18;
$P_{30}$=The reference power for the present corrected speed of ram fan 12 that corresponds to a 30% surge margin; and
$P_{12}$=The reference power for the present corrected speed of ram fan 12 that corresponds to a 12% surge margin.

Note that while equation [1] is described with reference to power, a similar equation may be utilized for current provided to motor 30. The index may then be used to determine a heat exchanger blockage level. For example, if the index is less than 0, then the heat exchanger(s) may be deemed clean. If the index is between 0 and 1, the heat exchanger(s) are becoming contaminated and should be monitored. If the index is greater than 1, the heat exchanger(s) are fully clogged and a maintenance alert should be issued by controller(s) 22 on data bus 20. While described with reference to lookup tables and equation [1], other mathematical relationships for the power/current provided to ram fan 12 and the corrected speed of ram fan 12 may be used to determine a heat exchanger blockage level.

At step 104, controller(s) 22 may provide a commanded speed for ram fan 12 to motor controller 18. Motor controller 18 provides power to motor 30 to drive ram fan 12 to the commanded speed. At step 106, motor controller 18 provides the present power or current provided to motor 30, and the present speed of ram fan 12, on data bus 20 to controller(s) 22. The speed of ram fan 12 may be determined using any method of determining a rotational speed of a fan. At step 108, controller(s) 22 obtain a temperature at ram air outlet 26. This may be accomplished using a direct reading of the temperature from temperature sensor 32, or the temperature may be estimated by controller(s) 22 using aircraft data including, among others, ambient temperature.

At step 110, controller(s) 22 use the speed of ram fan 12, the power or current used to drive ram fan 12, and the temperature to determine a heat exchanger deterioration index. This may be accomplished using the above equation [1], or may be accomplished in any other desirable manner. At step 112, it is determined if the deterioration index is indicative of a contaminated heat exchanger. If so, method 100 proceeds to step 114. If not, method 100 returns to step 102 and resumes normal system operation. At step 114, it is determined if the index is indicative of full blockage. If so, method 100 proceeds to step 116 and issues an alert. If not, method 100 proceeds to step 118 and monitors the heat exchanger. At step 116, the fan may be commanded to a safe speed or commanded off so as to prevent surge.

Discussion of Possible Embodiments

A system includes at least one heat exchanger, a ram fan, and a controller. The ram fan is driven by a motor. A motor control circuit is configured to provide power to the motor to drive the ram fan. The ram fan is configured to provide a ram flow through the at least one heat exchanger from a ram air inlet. The controller is configured to determine a blockage level of the at least one heat exchanger based on the power to the motor, a speed of the ram fan, and a temperature of the ram flow at the ram fan.

The system of the preceding paragraph can optionally include, additionally and/or alternatively, any one or more of the following features, configurations and/or additional components:

A further embodiment of the foregoing system, wherein the at least one heat exchanger includes a primary heat exchanger positioned to provide cooling for a compressed air flow using the ram flow; and at least one secondary heat exchanger.

A further embodiment of any of the foregoing systems, wherein the controller is configured to determine a corrected speed using the speed of the ram fan and the temperature of the ram flow at an inlet to the ram fan.

A further embodiment of any of the foregoing systems, further including a temperature sensor positioned to sense the temperature of the ram flow and provide the temperature of the ram flow at the inlet to the ram fan to the controller.

A further embodiment of any of the foregoing systems, wherein the controller is further configured to estimate the temperature of the ram flow at the inlet to the ram fan based at least in part on an ambient temperature.

A further embodiment of any of the foregoing systems, wherein the controller is configured to determine a first reference current using the corrected speed, wherein the first reference current is indicative of a first surge margin condition for the corrected speed, and wherein the controller is further configured to determine a second reference current using the corrected speed, wherein the second reference current is indicative of a second surge margin condition for the corrected speed.

A further embodiment of any of the foregoing systems, wherein the controller is configured to compare an actual current provided to the ram fan to the first and second reference currents to determine the blockage level of the at least one heat exchanger.

A further embodiment of any of the foregoing systems, wherein the first surge margin condition is a 30% surge margin condition and the second surge margin condition is a 12% surge margin condition.

A further embodiment of any of the foregoing systems, wherein the controller is configured to determine a first reference power using the corrected speed, wherein the first reference power is indicative of a first surge margin condition for the corrected speed, and wherein the controller is further configured to determine a second reference power using the corrected speed, wherein the second reference power is indicative of a second surge margin condition for the corrected speed, and wherein the controller is configured to compare the power provided to the ram fan to the first and second reference powers to determine the blockage level of the at least one heat exchanger A method includes driving, by a motor control circuit, a ram fan to draw a ram flow through at least one heat exchanger; providing, to a controller from the motor control circuit, power provided to a motor of the ram fan and a speed of the ram fan; determining, by the controller, a temperature of the ram flow at the ram fan; and determining a blockage level of the at least one heat exchanger based on the power provided to the motor, the speed of the ram fan, and the temperature of the ram flow.

The method of the preceding paragraph can optionally include, additionally and/or alternatively, any one or more of the following features, configurations and/or additional components:

A further embodiment of the foregoing method, further includes providing, by a primary heat exchanger and at least one secondary heat exchanger, cooling for a compressed air flow using the ram flow.

A further embodiment of any of the foregoing methods, further including determining, by the controller, a corrected speed using the speed of the ram fan and the temperature of the ram flow.

A further embodiment of any of the foregoing methods, wherein determining, by the controller, the temperature of the ram flow at the ram fan comprises sensing, by a temperature sensor positioned in the ram flow, the temperature of the ram flow at the ram fan.

A further embodiment of any of the foregoing methods, wherein determining, by the controller, the temperature of the ram flow at the ram fan comprises estimating, by the controller, the ram flow at the ram fan based at least in part on an ambient temperature.

An aircraft environmental control system includes a primary heat exchanger, a ram fan, and a controller. The primary heat exchanger is configured to provide cooling to a compressed air flow. The ram fan is driven by a motor. A motor control circuit is configured to provide current to the motor to drive the ram fan. The ram fan is configured to draw a ram flow through the primary heat exchanger from a ram air inlet. The controller is configured to determine a blockage level of the primary heat exchanger based on the current provided to the motor from the motor control circuit, and a corrected speed of the ram fan.

The aircraft environmental control system of the preceding paragraph can optionally include, additionally and/or alternatively, any one or more of the following features, configurations and/or additional components:

A further embodiment of the foregoing aircraft environmental control system, wherein the controller is configured to determine the blockage level for the primary heat exchanger by comparing the current provided to the motor to a first reference current and a second reference current, wherein the first reference current is indicative of a first surge margin condition for the corrected speed and the second reference current is indicative of a second surge margin condition for the corrected speed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A system comprising:
   at least one heat exchanger;
   a ram fan driven by a motor, wherein a motor control circuit is configured to provide power to the motor to drive the ram fan, wherein the ram fan is configured to provide a ram flow through the at least one heat exchanger from a ram air inlet; and
   a controller configured to determine a blockage level of the at least one heat exchanger based on a determined surge margin of the ram fan, wherein the controller is further configured to determine the determined surge margin based on the power to the motor, a corrected speed of the fan, and pre-determined data for the ram fan that is indicative of varying levels of contamination, wherein the corrected speed of the fan is determined using a speed of the ram fan and a temperature of the ram flow at an inlet to the ram fan.

2. The system of claim 1, wherein the at least one heat exchanger comprises:
   a primary heat exchanger positioned to provide cooling for a compressed air flow using the ram flow; and
   at least one secondary heat exchanger.

3. The system of claim 1, further comprising a temperature sensor positioned to sense the temperature of the ram flow at an inlet to the ram fan and provide the temperature of the ram flow at the inlet to the ram fan to the controller.

4. The system of claim 1, wherein the controller is further configured to estimate the temperature of the ram flow at the inlet to the ram fan based at least in part on an ambient temperature.

5. The system of claim 1, wherein the controller is configured to determine a first reference current using the corrected speed, wherein the first reference current is indicative of a first surge margin for the corrected speed, and wherein the controller is further configured to determine a second reference current using the corrected speed, wherein the second reference current is indicative of a second surge margin for the corrected speed.

6. The system of claim 5, wherein the controller is configured to compare an actual current provided to the ram fan to the first and second reference currents to determine the blockage level of the at least one heat exchanger.

7. The system of claim 5, wherein the first surge margin is a 30% surge margin and the second surge margin is a 12% surge margin.

8. The system of claim 1, wherein the controller is configured to determine a first reference power using the corrected speed, wherein the first reference power is indicative of a first surge margin for the corrected speed, and wherein the controller is further configured to determine a second reference power using the corrected speed, wherein the second reference power is indicative of a second surge margin for the corrected speed, and wherein the controller is configured to compare the power provided to the ram fan to the first and second reference powers to determine the blockage level of the at least one heat exchanger and to take action based on the blockage level of the at least one heat exchanger.

9. A method comprising:
 driving, by a motor control circuit, a ram fan to draw a ram flow through at least one heat exchanger;
 providing, to a controller from the motor control circuit, power provided to a motor of the ram fan, and a speed of the ram fan;
 determining, by the controller, a temperature of the ram flow at the ram fan; and
 determining a blockage level of the at least one heat exchanger based on a determined surge margin of the ram fan that is determined based on the power provided to the motor, a corrected speed of the fan, and pre-determined data for the ram fan that is indicative of varying levels of contamination, wherein the corrected speed of the fan is determined using the speed of the ram fan and the temperature of the ram flow.

10. The method of claim 9, further comprising:
 providing, by a primary heat exchanger and at least one secondary heat exchanger, cooling for a compressed air flow using the ram flow.

11. The method of claim 9, wherein the determining, by the controller, the temperature of the ram flow at the ram fan comprises sensing, by a temperature sensor positioned in the ram flow, the temperature of the ram flow at the ram fan.

12. The method of claim 9, wherein the determining, by the controller, the temperature of the ram flow at the ram fan comprises estimating, by the controller, the ram flow at the ram fan based at least in part on an ambient temperature.

13. The method of claim 9, further comprising:
 determining, by the controller, a first reference current using the corrected speed, wherein the first reference current is indicative of a first surge margin for the corrected speed; and
 determining, by the controller, a second reference current using the corrected speed, wherein the second reference current is indicative of a second surge margin for the corrected speed.

14. The method of claim 13, wherein the determining the blockage level of the at least one heat exchanger comprises comparing, by the controller, an actual current provided to the ram fan to the first and second reference currents to determine the blockage level of the at least one heat exchanger and taking action based on the blockage level of the at least one heat exchanger.

15. The method of claim 13, wherein the first surge margin is a 30% surge margin and the second surge margin is a 12% surge margin.

16. The method of claim 9, further comprising:
 determining, by the controller, a first reference power using the corrected speed, wherein the first reference power is indicative of a first surge margin for the corrected speed; and
 determining, by the controller, a second reference power using the corrected speed, wherein the second reference power is indicative of a second surge margin for the corrected speed;
 wherein determining the blockage level of the at least one heat exchanger comprises comparing, by the controller, the power provided to the ram fan to the first and second reference powers to determine the blockage level of the at least one heat exchanger and taking action based on the blockage level.

17. An aircraft environmental control system comprising:
 a primary heat exchanger configured to provide cooling to a compressed air flow;
 a ram fan driven by a motor, wherein a motor control circuit is configured to provide current to the motor to drive the ram fan, wherein the ram fan is configured to draw a ram flow through the primary heat exchanger from a ram air inlet; and
 a controller configured to determine a blockage level of the primary heat exchanger based on a determined surge margin of the ram fan, wherein the controller is further configured to compute the determined surge margin based on the current provided to the motor from the motor control circuit, a corrected speed of the ram fan, and pre-determined data for the ram fan that is indicative of varying levels of contamination.

18. The aircraft environmental control system of claim 17, wherein the controller is configured to determine the blockage level for the primary heat exchanger by comparing the current provided to the motor to a first reference current and a second reference current, wherein the first reference current is indicative of a first surge margin for the corrected speed and the second reference current is indicative of a second surge margin for the corrected speed.

* * * * *